United States Patent
Kim et al.

(10) Patent No.: US 9,430,865 B2
(45) Date of Patent: Aug. 30, 2016

(54) REAL-TIME DYNAMIC NON-PLANAR PROJECTION APPARATUS AND METHOD

(71) Applicant: Electronics and Telecommunications Research Institute, Daejeon (KR)

(72) Inventors: Hang-Kee Kim, Daejeon (KR); Young-Hee Kim, Daejeon (KR); Yong-Sun Kim, Sejong (KR); Ki-Hong Kim, Daejeon (KR); Hyun-Woo Cho, Daejeon (KR); Jin-Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/590,885

(22) Filed: Jan. 6, 2015

(65) Prior Publication Data

US 2015/0193964 A1 Jul. 9, 2015

(30) Foreign Application Priority Data

Jan. 7, 2014 (KR) .......... 10-2014-0001741

(51) Int. Cl.
*G06T 15/00* (2011.01)
*G06T 15/10* (2011.01)
(Continued)

(52) U.S. Cl.
CPC ........... *G06T 15/10* (2013.01); *G06K 9/00624* (2013.01); *H04N 9/3182* (2013.01); *H04N 9/3185* (2013.01); *H04N 9/3194* (2013.01)

(58) Field of Classification Search
CPC ..... G06T 17/30; G06T 7/0042; G06T 15/08; G06F 3/017; G03B 21/00
USPC .......................................................... 345/419
See application file for complete search history.

(56) References Cited

U.S. PATENT DOCUMENTS

2004/0207652 A1* 10/2004 Ratti .................... G06F 3/0425
 345/697
2005/0254726 A1* 11/2005 Fuchs ...................... H04N 5/74
 382/285

(Continued)

FOREIGN PATENT DOCUMENTS

KR 10-2004-0056489 A 7/2004
KR 10-2012-0112742 A 10/2012

(Continued)

OTHER PUBLICATIONS

Raskar et al: "The Office of the Future: A Unified Approach to Image-Based Modeling and Spatially Immersive Displays"; Jul. 1998, Computer Graphics Proceedings, pp. 1-10.*

(Continued)

*Primary Examiner* — Thomas Lett

(57) ABSTRACT

Disclosed herein is a real-time dynamic non-planar projection apparatus and method, which can reduce visual errors, such as distortion of a screen image or deviation from a border area, upon projecting screen images from a projector onto the surface of a non-planar object that is moved in real time. The presented real-time dynamic non-planar projection apparatus includes a preprocessing unit for preprocessing data related to a static part of a screen image to be projected onto a non-planar surface. A real-time projection unit classifies non-planar objects in the screen image to be projected onto the non-planar surface into a rigid body and a non-rigid body using data output from the preprocessing unit, respectively renders the rigid body and the non-rigid body depending on a viewer's current viewpoint, and projects rendered results onto the non-planar surface via projection mapping.

12 Claims, 7 Drawing Sheets

(51) Int. Cl.
*H04N 9/31* (2006.01)
*G06K 9/00* (2006.01)

(56) References Cited

U.S. PATENT DOCUMENTS

| | | |
|---|---|---|
| 2008/0129894 A1 | 6/2008 | Kang et al. |
| 2012/0057807 A1 | 3/2012 | Jaynes et al. |
| 2012/0242911 A1* | 9/2012 | Znamenskiy ....... G03F 7/70308 348/745 |
| 2013/0033484 A1* | 2/2013 | Liao ..................... G06T 7/0042 345/419 |
| 2013/0114799 A1* | 5/2013 | Yamakawa .............. A61B 6/14 378/207 |
| 2013/0127854 A1 | 5/2013 | Shpunt et al. |

FOREIGN PATENT DOCUMENTS

| | | |
|---|---|---|
| KR | 10-2013-0071100 A | 6/2013 |
| KR | 10-1273534 B1 | 6/2013 |

OTHER PUBLICATIONS

Lee et al: "Automatic Projector Calibration With Embedded Light Sensors"; UIST '04, Oct. 2004, ACM, pp. 1-4.*

* cited by examiner

REAL-TIME DYNAMIC NON-PLANAR PROJECTION APPARATUS AND METHOD

CROSS REFERENCE TO RELATED APPLICATION

This application claims the benefit of Korean Patent Application No. 10-2014-0001741, filed Jan. 7, 2014, which is hereby incorporated by reference in its entirety into this application.

GROUND OF THE INVENTION

1. Technical Field

The present invention relates generally to a real-time dynamic non-planar projection apparatus and method and, more particularly, to a real-time dynamic non-planar projection apparatus and method, which divide non-planar objects that are moved or deformed in real time into rigid bodies and non-rigid bodies and then show a desired screen image using a beam projector.

2. Description of the Related Art

Various attempts have been made to shift the location and direction of a projector in real time for irregular objects (objects that can be easily mathematically calculated, such as a face, a sphere, a box, a cylinder, and a cone) and non-planar objects (objects, the faces of which are not planar and have curves), and to track and project the objects.

Further, there is technology for correcting a color error which is inevitably caused due to the pattern of a curtain having a color other than white while performing projection onto a curtain or the like which is a non-planar object, and then reducing distortion of images without the pattern of the curtain being exposed. However, this technology is disadvantageous in that the range of color representation is inevitably reduced.

In the past, there have been various projection methods for an irregular screen, but such projection methods do not support projection onto a geometrical surface that is deformed in real time.

A case may frequently occur where a screen image must be projected onto a moving non-planar geometrical surface in such a way that a screen image is either projected onto a moving curtain in an indoor area or projected onto a screen in an outdoor area. However, for such a case, technology for precisely correcting a screen image is insufficient.

As related preceding technology, Korean Patent No. 1273534 (entitled "Screen correction method using an automatic screen correction system for stereoscopic image projection") presents technology in which a screen correction enabling the locations and magnitudes of screen images projected from respective beam projectors onto a screen to be identical to each other is automatically performed by an infrared projector, an infrared reflector marker, an infrared sensor camera module, and a computer device, thus improving the matching and convenience of a screen correction operation.

As another related preceding technology, U.S. Patent Application Publication No. 2013-0127854 (entitled "Scanning projectors and image capture modules for 3D mapping") discloses technology for not only obtaining projected patterns, but also efficiently performing three-dimensional (3D) mapping, in order to perform efficient projection of patterns.

As further related preceding technology, U.S. Patent Application Publication No. 2012-0057807 (entitled "Hybrid system for multi-projector geometry calibration") discloses a system used to generate respective complementary parts of projected images which may be videos or still images.

SUMMARY OF THE INVENTION

Accordingly, the present invention has been made keeping in mind the above problems occurring in the prior art, and an object of the present invention is to provide a real-time dynamic non-planar projection apparatus and method, which can reduce visual errors, such as distortion of a screen image or deviation from a border area, upon projecting screen images from a projector onto the surface of a non-planar object that is moved in real time.

In accordance with an aspect of the present invention to accomplish the above object, there is provided a real-time dynamic non-planar projection apparatus, including a preprocessing unit for preprocessing data related to a static part of a screen image to be projected onto a non-planar surface; and a real-time projection unit for classifying non-planar objects in the screen image to be projected onto the non-planar surface into a rigid body and a non-rigid body using data output from the preprocessing unit, respectively rendering the rigid body and the non-rigid body depending on a viewer's current viewpoint, and projecting rendered results onto the non-planar surface via projection mapping.

The preprocessing unit may include a background mesh structure storage module for previously obtaining and storing mesh values for a background of the screen image to be projected onto the non-planar surface; a foreground rigid body mesh structure storage module for previously obtaining and storing mesh values for a rigid body in a foreground other than the background; and a projector calibration module for calibrating intrinsic parameters and extrinsic parameters of a projector that will project the screen image onto the non-planar surface.

The preprocessing unit may further include a background mask generation and storage module for setting a fixed part of an area desired to be tracked in real time to a masking area and storing the masking area.

The real-time projection unit may include a previous frame storage module for storing a previous frame so as to calculate a change between frames of the screen image projected onto the non-planar surface; a viewer viewpoint tracking module for tracking the viewer's viewpoint; a rigid body/non-rigid body classification module for classifying each non-planar object as one of a rigid body and a non-rigid body; a rendering module for respectively rendering the rigid body and the non-rigid body classified by the rigid body/non-rigid body classification module; and a projection mapping module for performing projection mapping on rendered results of the rendering module depending on a variation in the viewer's viewpoint.

The rigid body/non-rigid body classification module may include a depth map extraction module for extracting a depth map from the non-planar object in real time; a depth map partial grouping module for separating a depth as a group of connected meaningful units from the depth map extracted by the depth map extraction module; a first comparison module for comparing a depth of a previous frame and a depth of a current frame of the separated group with each other and calculating a difference between the depths; and a second comparison module for comparing the difference output from the first comparison module with a preprocessed rigid body mesh of a mesh group of a foreground separated from a background and then determining whether the separated group is a rigid body.

The second comparison module may be configured to compare the difference output from the first comparison module with the preprocessed rigid body mesh of the mesh group of the foreground separated from the background, and recognize the corresponding group as the rigid body if a result of the comparison output is less than a preset threshold.

The rendering module may include a rigid body rendering module for, upon rendering the rigid body, applying a difference from the previous frame to the rigid body to a transform matrix of an image to be projected based on a location and a direction, thus projecting the image; and a non-rigid body rendering module for, upon rendering the non-rigid body, obtaining a deformed mesh depending on a variation in depth, and applying a viewpoint-tracked value to a rendering camera, thus rendering the image via projection mapping to the mesh.

In accordance with another aspect of the present invention to accomplish the above object, there is provided a real-time dynamic non-planar projection method, including preprocessing, by a preprocessing unit, data related to a static part of a screen image to be projected onto a non-planar surface; classifying, by a real-time projection unit, non-planar objects in the screen image to be projected onto the non-planar surface into a rigid body and a non-rigid body using data output from the preprocessing unit; and respectively rendering, by the real-time projection unit, the rigid body and the non-rigid body depending on a viewer's current viewpoint, and projecting rendered results onto the non-planar surface via projection mapping.

Preprocessing the data may include previously obtaining and storing mesh values for a background of the screen image to be projected onto the non-planar surface; previously obtaining and storing mesh values for a rigid body in a foreground other than the background; and calibrating intrinsic parameters and extrinsic parameters of a projector that will project the screen image onto the non-planar surface.

Preprocessing the data may further include setting a fixed part of an area desired to be tracked in real time to a masking area and storing the masking area.

Classifying as the rigid body and the non-rigid body may include extracting a depth map from the non-planar object in real time; separating a depth as a group of connected meaningful units from the depth map; comparing a depth of a previous frame and a depth of a current frame of the separated group with each other and calculating a difference between the depths; and comparing the calculated difference with a preprocessed rigid body mesh of a mesh group of a foreground separated from a background and then determining whether the separated group is a rigid body.

Determining whether the separated group is the rigid body may include comparing the calculated difference with the preprocessed rigid body mesh of the mesh group of the foreground separated from the background, and recognizing the corresponding group as the rigid body if a result of the comparison is less than a preset threshold.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
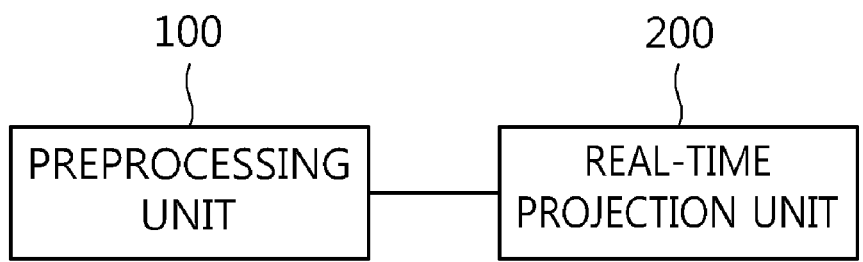
FIG. 1 is a configuration diagram of a real-time dynamic non-planar projection apparatus according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

The present invention is technically characterized in that, in order to reduce visual errors, such as distortion of a screen image or deviation from a border area, upon projecting screen images from a projector onto the surface of a non-planar object that is moved in real time, data required for a preprocessing step is collected, and objects are divided into rigid bodies and non-rigid bodies using a depth map upon real-time projection, thus showing desired screen images without distortion when using a beam projector.

FIG. 1 is a configuration diagram showing a real-time dynamic non-planar projection apparatus according to an embodiment of the present invention.

The real-time dynamic non-planar projection apparatus of FIG. 1 includes a preprocessing unit 100 and a real-time projection unit 200.

The preprocessing unit 100 preprocesses data about a static part of a screen (image) that is to be projected onto a non-planar surface (e.g., a curtain, etc.) and that can be preprocessed. This is intended to reduce waste of time upon real-time processing.

The real-time projection unit 200 performs projection using real-time varying values, together with static values obtained by the preprocessing unit 100, without causing screen image distortion. In other words, the real-time projection unit 200 classifies non-planar objects (e.g., fabrics, a radio controlled (RC) car, a table, a wood box, etc.) in a screen image to be projected onto a non-planar surface into rigid bodies and non-rigid bodies by exploiting data from the preprocessing unit 100, renders the classified rigid bodies and non-rigid bodies depending on the current viewpoint of a viewer, and then projects the results of rendering onto the non-planar surface via projection mapping.

Figure 2:
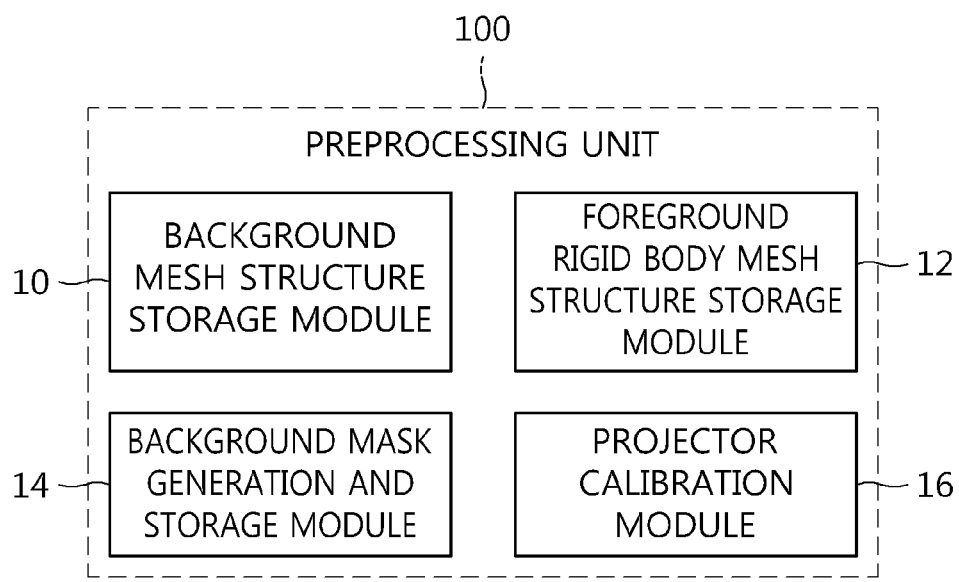
FIG. 2 is a block diagram showing the internal configuration of a preprocessing unit shown in FIG. 1.

FIG. 2 is a block diagram showing the internal configuration of the preprocessing unit shown in FIG. 1.

The preprocessing unit 100 includes a background mesh structure storage module 10, a foreground rigid body mesh structure storage module 12, a background mask generation and storage module 14, and a projector calibration module 16.

The background mesh structure module 10 previously obtains and stores mesh values for a static face or object, such as a background. That is, the background mesh structure storage module 10 may be regarded as previously obtaining and storing mesh values for a background in a screen image to be projected onto the non-planar surface. Preferably, the mesh values in the background mesh structure storage module 10 are used to subsequently separate a background from a foreground.

A part to be perceived in a single scene in which two areas abutting on a border line are present may be designated as a foreground, and the remaining part may be designated as a background. In other words, it seems that the foreground is placed ahead and the background is placed behind. Thus, when the two areas share the border with each other, the foreground has a tendency to exhibit a clear shape, whereas the background merely exhibits a background.

The foreground rigid body mesh structure storage module 12 previously obtains mesh values for a rigid body in a foreground, other than a background, in a single scene, and stores the mesh values so that only a transform is applied to the mesh values.

In the specification of the present invention, the term "rigid body" denotes an object, only the location and direction of which are varied, without causing variation in the geometrical structure of the object, on a non-planar surface that is varying in real time. Examples of a rigid body include objects, such as an RC car, a table, and a wood box, the locations and directions of which are varied, and the geometrical structures of which are not varied. Motion of a rigid body may include a variation in size, but the size is not mostly varied. Meanwhile, a non-rigid body denotes an object such as fabrics, the geometrical structure of the surface of which is varied. Examples of a non-rigid body include objects, such as a curtain, the surface of a tent, a balloon, and rubber clay, the geometrical structures of which, as well as the locations and directions of which, are varied.

The background mask generation and storage module 14 is configured to, when a static and fixed part of an area to be tracked in real time is previously known, set the fixed part to a masking area and store the masking area.

The projector calibration module 16 performs calibration of intrinsic parameters and extrinsic parameters of a projector, which will project a screen image onto the non-planar surface, and (internal and external) calibration of a depth map extraction device, and stores the parameters.

Figure 3:
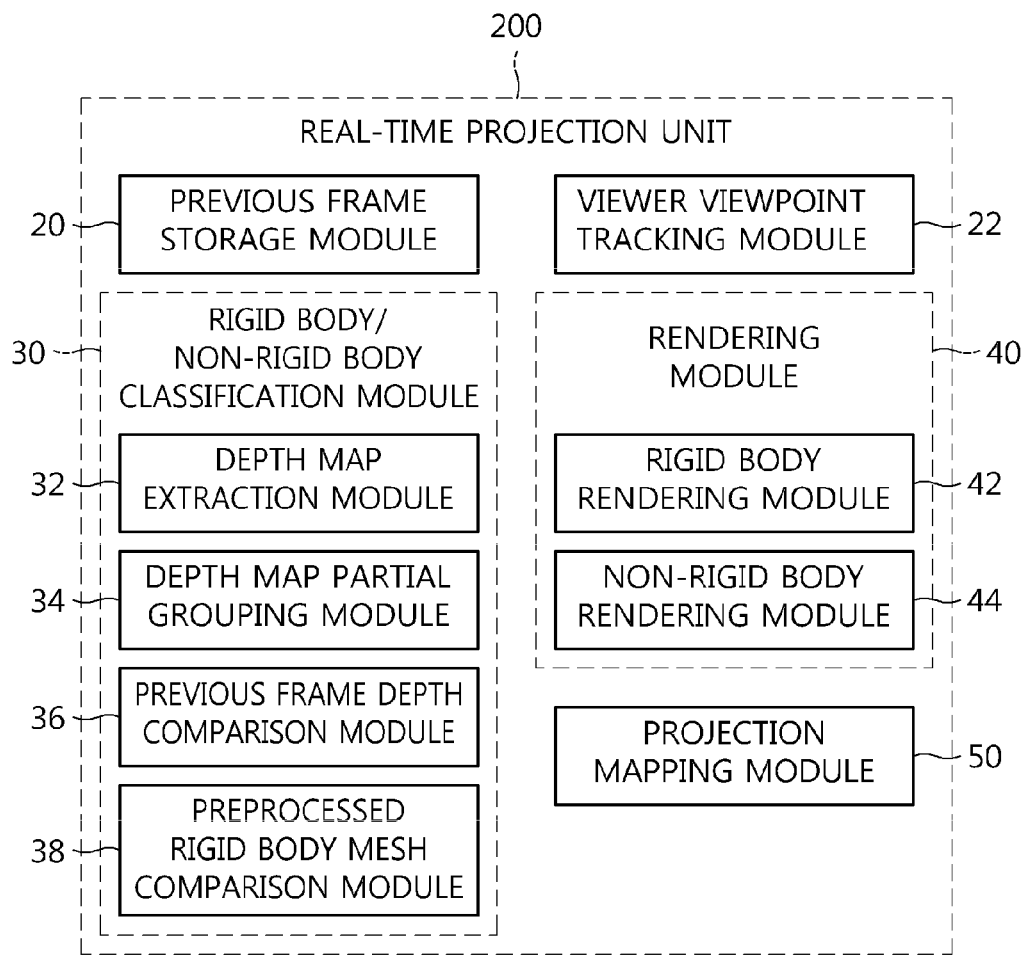
FIG. 3 is a block diagram showing the internal configuration of a real-time projection unit shown in FIG. 1.

FIG. 3 is a block diagram showing the internal configuration of the real-time projection unit shown in FIG. 1.

The real-time projection unit 200 includes a previous frame storage module 20, a viewer viewpoint tracking module 22, a rigid body/non-rigid body classification module 30, a rendering module 40, and a projection mapping module 50.

The previous frame storage module 20 stores previous frames so as to calculate a change between the frames of a screen image of the projector projected onto the non-planar surface which is moved or deformed in real time.

The viewer viewpoint tracking module 22 tracks a viewer's viewpoint so that projection mapping is possible depending on the viewer's viewpoint, calculates location (translation)/direction(rotation) for each frame, and applies the calculated location/direction to a rendering camera. For example, the viewer viewpoint tracking module 22 may use an eye tracking scheme or a head tracking scheme. It is apparent that the eye tracking or head tracking scheme may be sufficiently understood by those skilled in the art from well-known technology even if an additional description thereof is not separately made.

The rigid body/non-rigid body classification module 30 classifies each non-planar object (that is, an object) which is moved or deformed in real time as one of a rigid body and a non-rigid body. For this, the rigid body/non-rigid body classification module 30 includes a depth map extraction module 32, a depth map partial grouping module 34, a previous frame depth comparison module 36, and a preprocessed rigid body mesh comparison module 38. The depth map extraction module 32 extracts a depth map in real time from the non-planar object that is moved or deformed in real time. The depth map partial grouping module 34 separates a depth as a group of connected meaningful units from the depth map extracted by the depth map extraction module 32. The previous frame depth comparison module 36 compares the depth of a previous frame and the depth of a current frame of the separated group with each other, and calculates a difference between the depths. The preprocessed rigid body mesh comparison module 38 compares the result of the comparison (difference) output from the previous frame depth comparison module 36 with a preprocessed rigid body mesh of a mesh group of the foreground separated from the background, and recognizes the corresponding group as a rigid body if the result of the comparison is less than a preset threshold.

Here, the previous frame depth comparison module 36 may be an example of a first comparison module described in the accompanying claims in the present invention, and the preprocessed rigid body mesh comparison module 38 may be an example of a second comparison module described in the accompanying claims of the present invention.

The rendering module 40 separately renders rigid bodies and non-rigid bodies classified by the rigid body/non-rigid body classification module 30. For this, the rendering module 40 includes a rigid body rendering module 42 and a non-rigid body rendering module 44. The rigid body rendering module 42 is configured to, upon rendering each rigid body, apply a difference from the previous frame to a transform matrix of an image to be projected based on a location (translation) and a direction (rotation). The non-rigid body rendering module 44 is configured to, upon rendering a non-rigid body, obtain a deformed mesh depending on the variation in depth, and apply a viewpoint-tracked value to the rendering camera, thus rendering the image via projection mapping to the mesh.

The projection mapping module 50 performs projection mapping by applying the viewpoint-tracked value to the location and direction of the rendering camera depending on the variation in the user's viewpoint.

Figure 4:
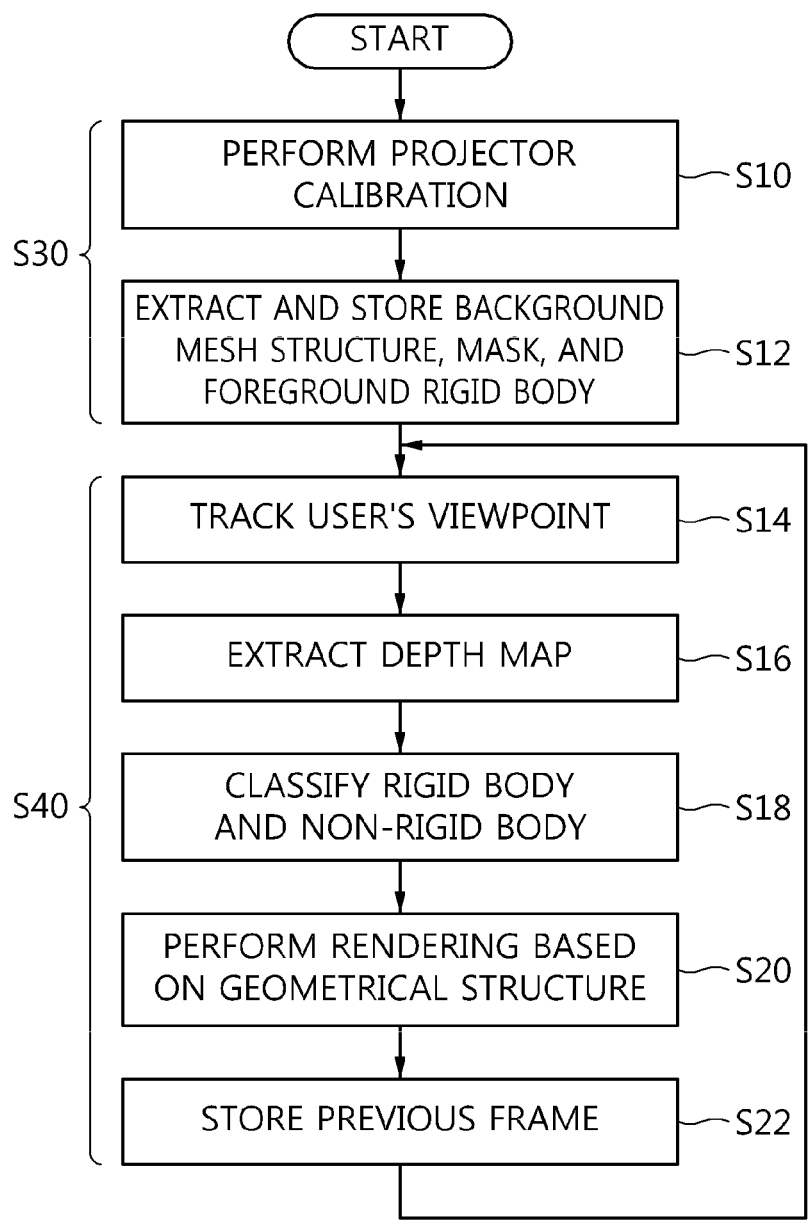
FIG. 4 is a flowchart showing a real-time dynamic non-planar projection method according to an embodiment of the present invention.
Figure 5:
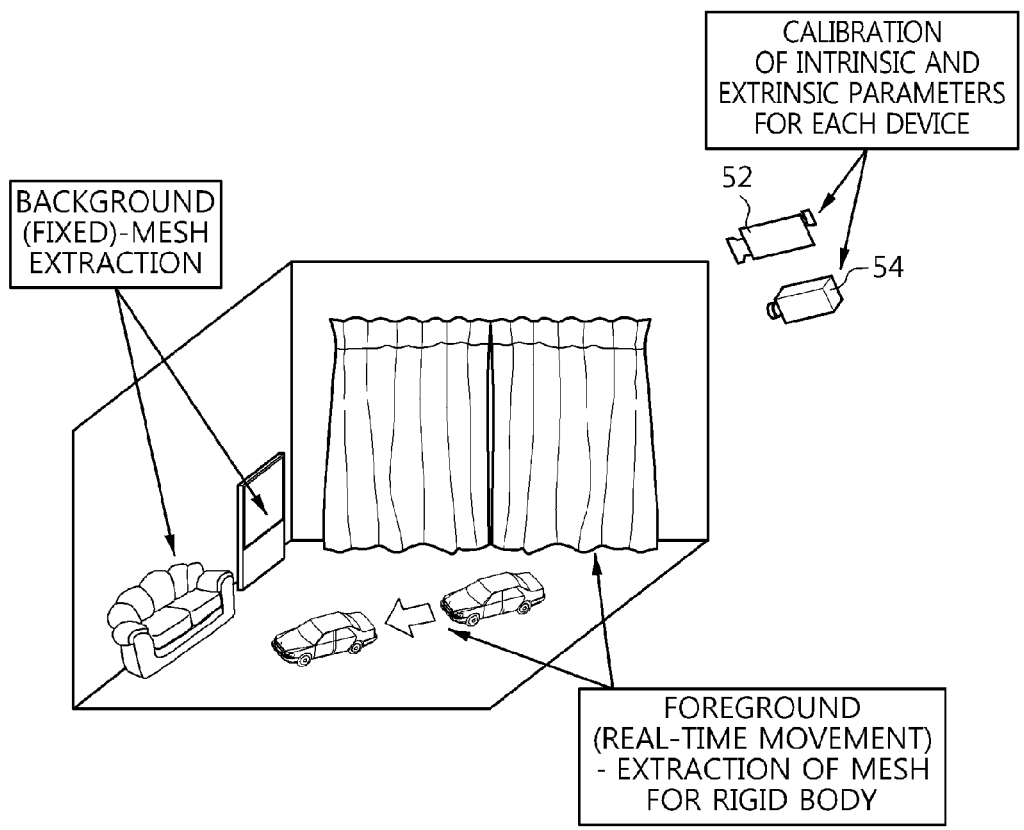
FIG. 5 is a diagram employed to describe a preprocessing procedure in the real-time dynamic non-planar projection method according to an embodiment of the present invention.
Figure 6:
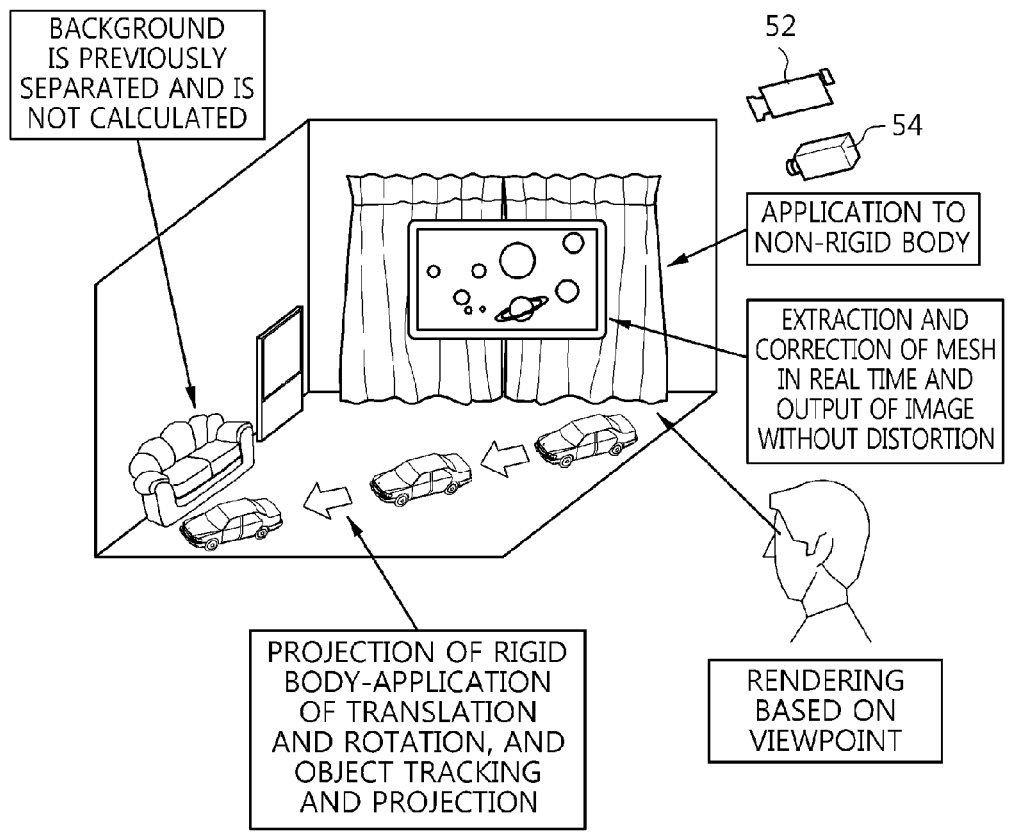
FIG. 6 is a diagram employed to describe a real-time projection processing procedure in the real-time dynamic non-planar projection method according to an embodiment of the present invention.

Hereinafter, a real-time dynamic non-planar projection method according to an embodiment of the present invention will be described. FIG. 4 is a flowchart showing a real-time dynamic non-planar projection method according to an embodiment of the present invention, FIG. 5 is a diagram employed to describe a preprocessing procedure in the real-time dynamic non-planar projection method according to an embodiment of the present invention, and FIG. 6 is a diagram employed to describe a real-time projection processing procedure in the real-time dynamic non-planar projection method according to an embodiment of the present invention.

After a preprocessed data collection procedure has been performed at step S30, the present invention performs real-time projection based on the preprocessed data at step S40.

In the preprocessing procedure S30, projector calibration is performed at step S10. Projector calibration is performed by the projector calibration module 16 of the preprocessing unit 100. That is, extrinsic parameters of a projector 54, such as a location and a direction, are calculated, together with intrinsic parameters, such as a focal length (i.e., a distance from a principal point to a focal point), a skew, and the principal point (i.e., a point at which a principle plane intersects an optical axis), which are not influenced by the external environment of the projector 54. Meanwhile, a depth map extraction device (not shown, including a 3D scanner 52) for extracting a depth map in real time may frequently extract color values, as well as depth values, in many cases. Even in the device, calibration of intrinsic parameters (focal length, etc.), and calibration of extrinsic parameters (location, direction, etc.) must be performed.

After projector calibration, a procedure for extracting and storing a background mesh structure, a background mask, and a foreground rigid body is performed at step S12. Here, the extraction and storage of the background mesh structure are performed by the background mesh structure storage module 10, the extraction and storage of the background mask are performed by the background mask generation and storage module 14, and the extraction and storage of the foreground rigid body are performed by the foreground rigid body mesh structure storage module 12.

A procedure for extracting a static mesh from a projection environment is performed by utilizing a mesh extraction technique based on the existing 3D scanner 52. In order to reduce a load upon real-time processing by normal hardware (H/W), an optimization and simplification procedure for reducing the number of polygons used for a mesh may be performed. In this case, even for an object that is deformed in real time, a mesh is previously obtained and then precision may be improved when a mesh is tracked in real time. For a static face or object such as a background, mesh values are previously obtained using a depth map and a color map, thus enabling a foreground and a background to be distinguished from each other while reducing a load required to obtain the entire mesh upon real-time processing. Although a mesh may be configured only using the depth map, errors may be reduced by compensating for visually important parts, such as edges, using the color map. Since a mesh may be configured using only the projector and the color map, the extraction of a static mesh does not need to be limited to a specific method. In particular, a high computational load may be reduced upon subsequently performing real-time computations if, for planar backgrounds such as walls, planes (represented by vertices and normals) are approximated, for spheres such as static balls, spheres (represented by center positions and radii) are approximated, and for static boxes, boxes (represented by horizontal and vertical lengths and heights) are approximated.

Meanwhile, among dynamically moving rigid bodies, even for objects from which meshes may be previously extracted, meshes may be previously calculated, and thus the meshes are used as candidates upon performing dynamic comparison.

Meanwhile, if, in an area desired to be tracked in real time, a static and fixed part is known in advance, the corresponding area may be previously processed as a masking area and may be excluded upon real-time tracking.

After the above-described preprocessing procedure S30, the real-time projection procedure S40 is performed. The real-time projection procedure S40 is a procedure for performing projection using values that vary in real time, together with static values obtained in the preprocessing procedure S30, without causing screen image distortion.

Non-planar surfaces that vary in real time may be classified into rigid bodies, the location and direction of which are merely varied without causing a variation in the geometrical structure of an object, and non-rigid bodies, the geometrical structures of the surfaces of which are varied, such as in the case of fabrics. Therefore, in an embodiment of the present invention, for a rigid body and a non-rigid body, real-time projection is separately processed. The reason for performing projection by separating a rigid body from a non-rigid body is that the characteristics of objects that are projected and shown are different from each other for the rigid body and for the non-rigid body. For the rigid body, the rigid body may be rendered by causing a given object to correspond to a specific rendering model and by changing only the translation and rotation of the same model according to the motion of the object. For example, when a bus-shaped rectangular object is shown by using a bus texture as a rendering model, even after the corresponding rectangular object has moved, the bus may be shown by rendering the bus texture by changing the translation and rotation transform of the texture. For the non-rigid body, it is impossible to render the non-rigid body while tracking such a translation and rotation transform. Therefore, this scheme may be applied to the case where an image, in which an error is not caused in a projected image even if the geometrical structure of the object is changed, is output. For example, regardless of the shape of an object, a predetermined repetitive pattern may be rendered or, alternatively, physical animation, color, contour output, etc. may be projected as objects of a non-rigid body depending on several tens of laser beams extending from a center to an outer portion, or a deformed shape.

Therefore, in the real-time projection procedure S40, a user's viewpoint is first tracked by the viewer viewpoint tracking module 22 of the real-time projection unit 200 at step S14.

Thereafter, a depth map is extracted by the depth map extraction module 32 at step S16. That is, the depth map is extracted in real time for correct projection of an object that is moved in real time.

Then, the depth map partial grouping module 34 separates a depth as a group of connected meaningful units from the depth map extracted by the depth map extraction module 32, the previous frame depth comparison module 36 compares the depth stored in the previous frame and the depth of the current frame of the separated group with each other, calculates a difference between the depths, and the preprocessed rigid body mesh comparison module 38 compares the difference with a preprocessed rigid body mesh of the mesh group of a mesh separated from a background, and recognizes the corresponding group as a rigid body if the result of the comparison is less than a preset threshold, thus separating a rigid body from a non-rigid body at step S18. A method of separating a rigid body from a non-rigid body in real time will be described in detail again below. First, a depth map is extracted, and a static background that has been detected and known in the preprocessing procedure is separated from a foreground. Then, in order to identify an N-th rendered frame in real time, depth values of the depth map are separated as groups of meaningful units. Thereafter, bounding boxes of the respective groups are obtained, and are converted into local coordinates based on the centers thereof. Depth value groups separated in this way are compared with depth value groups stored in a previous N−1 frame. If the average of difference values obtained when only a rotation and translation transform is applied is less than a preset threshold, the rigid body is found in the corresponding object. Here, if rigid bodies previously found in the preprocessing procedure upon performing separation in the depth value groups are primarily detected, the rigid bodies may be further rapidly detected. In preparation for a case where a computational load is excessively high in the procedure for comparing depth values, a scheme for obtaining a sparse depth, the density of which is reduced, and comparing the obtained sparse depth with the sparse depth of a previous N−1-th frame may be adopted. For example, if an 8*8 depth grid forms a single group, a 4*4 sparse depth may be obtained and may be compared with the sparse depth of a previous N−1-th frame. Further, the computation speed for depth groups may be raised by using a Graphics Processing Unit (GPU).

After the rigid body and the non-rigid body have been classified, the rigid body rendering module 42 renders the classified rigid body, and the non-rigid body rendering module 44 renders the classified non-rigid body at step S20. Here, the rendered rigid body (e.g., RC car) is projection-mapped by the projection mapping module 50, as shown in FIG. 6, and the rendered non-rigid body (e.g., curtain) is also projection-mapped by the projection mapping module 50, as shown in FIG. 6. Meanwhile, a method of obtaining a projection map may be implemented using an existing method of projecting a screen image by obtaining a projection map matrix based on a camera and a mesh structure. That is, depending on a current user's viewpoint, rendering suitable for individual characteristics is performed using rigid body and non-rigid body meshes, the projection map of a rendered scene is obtained, and thereafter the projection map needs only to be projected by a previously calibrated projector 54.

In this way, after projection mapping has been terminated, the previous frame storage module 20 stores a previous frame so as to calculate a change between frames at step S22.

Thereafter, the process returns to the user (viewer) viewpoint tracking step S14 where the operation starting from step S14 is repeated.

In accordance with the present invention, a screen image can be correctly projected without distortion of the image, even on a moving non-planar surface.

That is, when a screen image is projected from a projector on the surface of a non-planar object which is moved in real time, visual errors such as screen image distortion or deviation from a border area may be reduced.

The present invention classifies a rigid body and a non-rigid body from a mesh extracted from a depth map in real time, thus showing a desired screen image without distortion when using a beam projector.

Figure 7:
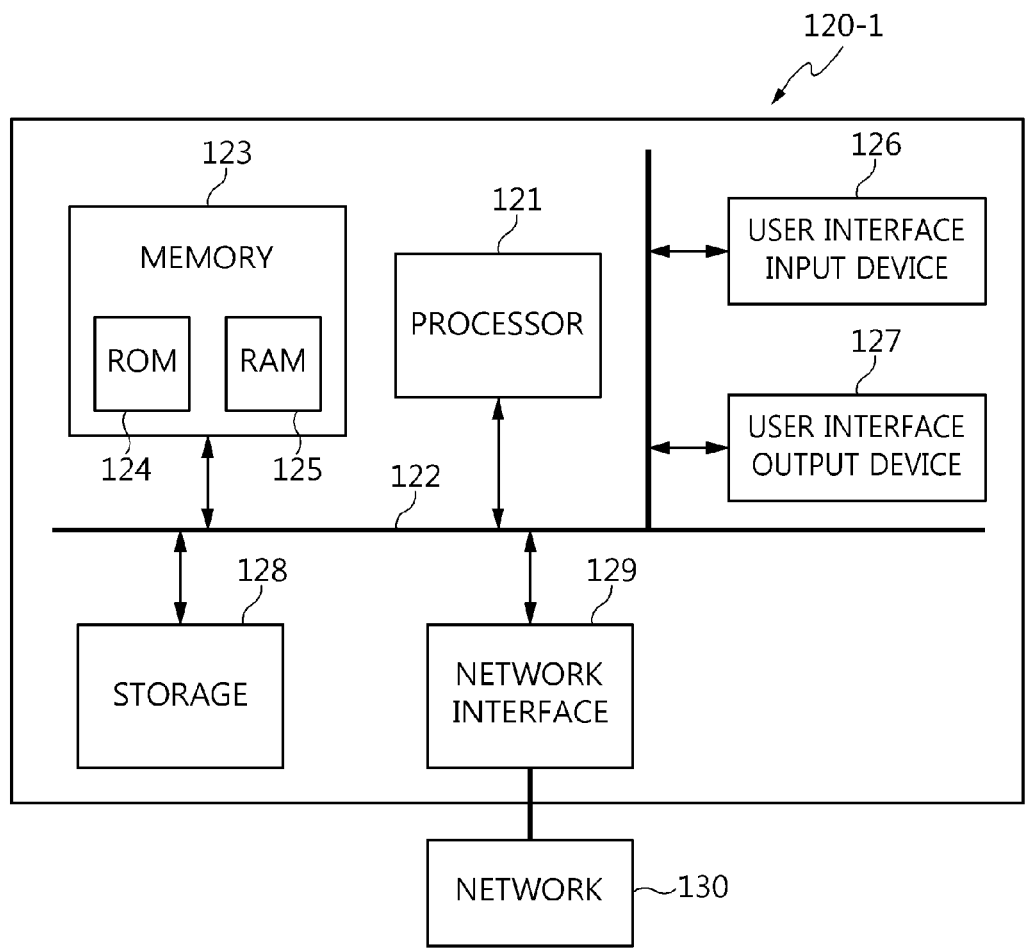
FIG. 7 is an embodiment of the present invention implemented in a computer system.

FIG. 7 is an embodiment of the present invention implemented in a computer system.

Referring to FIG. 7, an embodiment of the present invention may be implemented in a computer system, e.g., as a computer readable medium. As shown in FIG. 7, a computer system 120-1 may include one or more of a processor 121, a memory 123, a user interface input device 126, a user interface output device 127, and a storage 128, each of which communicates through a bus 122. The computer system 120-1 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory (RAM) 125.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A real-time dynamic non-planar projection apparatus, comprising:
   a preprocessing unit for preprocessing data related to a static part of a screen image to be projected onto a non-planar surface; and
   a real-time projection unit for classifying non-planar objects in the screen image to be projected onto the non-planar surface into a rigid body and a non-rigid body using data output from the preprocessing unit, respectively rendering the rigid body and the non-rigid body depending on a viewer's current viewpoint, and projecting rendered results onto the non-planar surface via projection mapping,
   wherein the preprocessing unit comprises:
      a background mesh structure storage module for previously obtaining and storing mesh values for a background of the screen image to be projected onto the non-planar surface;

a foreground rigid body mesh structure storage module for previously obtaining and storing mesh values for a rigid body in a foreground other than the background; and a projector calibration module for calibrating intrinsic parameters and extrinsic parameters of a projector that will project the screen image onto the non-planar surface.

2. The real-time dynamic non-planar projection apparatus of claim 1, wherein the preprocessing unit further comprises a background mask generation and storage module for setting a fixed part of an area desired to be tracked in real time to a masking area and storing the masking area.

3. The real-time dynamic non-planar projection apparatus of claim 1, wherein the real-time projection unit comprises:

a previous frame storage module for storing a previous frame so as to calculate a change between frames of the screen image projected onto the non-planar surface;

a viewer viewpoint tracking module for tracking the viewer's viewpoint;

a rigid body/non-rigid body classification module for classifying each non-planar object as one of a rigid body and a non-rigid body;

a rendering module for respectively rendering the rigid body and the non-rigid body classified by the rigid body/non-rigid body classification module; and a projection mapping module for performing projection mapping on rendered results of the rendering module depending on a variation in the viewer's viewpoint.

4. The real-time dynamic non-planar projection apparatus of claim 3, wherein the rigid body/non-rigid body classification module comprises:

a depth map extraction module for extracting a depth map from the non-planar object in real time;

a depth map partial grouping module for separating a depth as a group of connected meaningful units from the depth map extracted by the depth map extraction module;

a first comparison module for comparing a depth of a previous frame and a depth of a current frame of the separated group with each other and calculating a difference between the depths; and a second comparison module for comparing the difference output from the first comparison module with a preprocessed rigid body mesh of a mesh group of a foreground separated from a background and then determining whether the separated group is a rigid body.

5. The real-time dynamic non-planar projection apparatus of claim 4, wherein the second comparison module is configured to compare the difference output from the first comparison module with the preprocessed rigid body mesh of the mesh group of the foreground separated from the background, and recognize the corresponding group as the rigid body if a result of the comparison output is less than a preset threshold.

6. The real-time dynamic non-planar projection apparatus of claim 3, wherein the rendering module comprises:

a rigid body rendering module for, upon rendering the rigid body, applying a difference from the previous frame to the rigid body to a transform matrix of an image to be projected based on a location and a direction, thus projecting the image; and a non-rigid body rendering module for, upon rendering the non-rigid body, obtaining a deformed mesh depending on a variation in depth, and applying a viewpoint-tracked value to a rendering camera, thus rendering the image via projection mapping to the mesh.

7. A real-time dynamic non-planar projection method, comprising:

preprocessing, by a preprocessing unit, data related to a static part of a screen image to be projected onto a non-planar surface;

classifying, by a real-time projection unit, non-planar objects in the screen image to be projected onto the non-planar surface into a rigid body and a non-rigid body using data output from the preprocessing unit; and respectively rendering, by the real-time projection unit, the rigid body and the non-rigid body depending on a viewer's current viewpoint, and projecting rendered results onto the non-planar surface via projection mapping, wherein classifying the non-planar object comprises:

extracting a depth map from the non-planar object in real time;

separating a depth as a group of connected meaningful units from the depth map;

comparing a depth of a previous frame and a depth of a current frame of the separated group with each other and calculating a difference between the depths; and comparing the calculated difference with a preprocessed rigid body mesh of a mesh group of a foreground separated from a background and then determining whether the separated group is a rigid body.

8. The real-time dynamic non-planar projection method of claim 7, wherein preprocessing the data comprises:

previously obtaining and storing mesh values for a background of the screen image to be projected onto the non-planar surface;

previously obtaining and storing mesh values for a rigid body in a foreground other than the background; and calibrating intrinsic parameters and extrinsic parameters of a projector that will project the screen image onto the non-planar surface.

9. The real-time dynamic non-planar projection method of claim 8, wherein preprocessing the data further comprises setting a fixed part of an area desired to be tracked in real time to a masking area and storing the masking area.

10. The real-time dynamic non-planar projection method of claim 7, wherein determining whether the separated group is the rigid body comprises comparing the calculated difference with the preprocessed rigid body mesh of the mesh group of the foreground separated from the background, and recognizing the corresponding group as the rigid body if a result of the comparison is less than a preset threshold.

11. A real-time dynamic non-planar projection method, comprising:

preprocessing, by a preprocessing unit, data related to a static part of a screen image to be projected onto a non-planar surface;

classifying, by a real-time projection unit, non-planar objects in the screen image to be projected onto the non-planar surface into a rigid body and a non-rigid body using data output from the preprocessing unit; and respectively rendering, by the real-time projection unit, the rigid body and the non-rigid body depending on a viewer's current viewpoint, and projecting rendered results onto the non-planar surface via projection mapping, wherein preprocessing the data comprises:
  previously obtaining and storing mesh values for a background of the screen image to be projected onto the non-planar surface;
  previously obtaining and storing mesh values for a rigid body in a foreground other than the background; and
  calibrating intrinsic parameters and extrinsic parameters of a projector that will project the screen image onto the non-planar surface.

12. The real-time dynamic non-planar projection method of claim 11, wherein preprocessing the data further comprises setting a fixed part of an area desired to be tracked in real time to a masking area and storing the masking area.

* * * * *